US012504722B2

(12) United States Patent
Kurokawa

(10) Patent No.: US 12,504,722 B2
(45) Date of Patent: Dec. 23, 2025

(54) DETECTION DEVICE AND TIMEPIECE

(71) Applicant: CASIO COMPUTER CO., LTD., Tokyo (JP)

(72) Inventor: Tomoyasu Kurokawa, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 346 days.

(21) Appl. No.: 18/189,378

(22) Filed: Mar. 24, 2023

(65) Prior Publication Data

US 2023/0305499 A1 Sep. 28, 2023

(30) Foreign Application Priority Data

Mar. 24, 2022 (JP) ................................ 2022-047803

(51) Int. Cl.
*G04G 21/02* (2010.01)
*G04G 17/04* (2006.01)

(52) U.S. Cl.
CPC ........... *G04G 21/025* (2013.01); *G04G 17/04* (2013.01)

(58) Field of Classification Search
CPC .... G04G 21/025; G04G 17/04; G04B 47/063; G04B 37/11; G04B 39/00; A61B 5/02
See application file for complete search history.

(56) References Cited

U.S. PATENT DOCUMENTS 8,670,819 B2 3/2014 Iwamiya et al.
11,445,921 B2 9/2022 Yoshizawa et al.
11,744,519 B2 9/2023 Hashimoto et al.
2011/0004106 A1 1/2011 Iwamiya et al.
2017/0020401 A1 1/2017 Nakayama et al.
2018/0042486 A1 2/2018 Yoshizawa et al.
2020/0037960 A1 2/2020 Hashimoto et al.
2021/0000355 A1 1/2021 Zukawa et al.
2021/0127469 A1* 4/2021 Lee ........................ H05B 45/10
2021/0263475 A1* 8/2021 Yamakawa ............ G04C 10/02

FOREIGN PATENT DOCUMENTS

JP 2011147746 A 8/2011
JP 5056867 B2 10/2012
JP 2013063205 A 4/2013
JP 2016190022 A 11/2016
JP 2017023509 A 2/2017
JP 2019004924 A 1/2019
JP 2019209128 A 12/2019
JP 2020018430 A 2/2020
JP 6683367 B2 4/2020
JP 2020062529 A 4/2020
JP 6727599 B2 7/2020
JP 6803299 B2 12/2020

OTHER PUBLICATIONS

Notice of Reasons for Refusal dated Oct. 31, 2023 received in Japanese Patent Application No. JP 2022-047803.

* cited by examiner

*Primary Examiner* — Edwin A. Leon
(74) *Attorney, Agent, or Firm* — Scully, Scott, Murphy & Presser, P.C.

(57) ABSTRACT

A detection device including a device main body and a display arranged on an upper side of the device main body, in which the device main body is provided with a window for conducting a waterproof test.

19 Claims, 6 Drawing Sheets

DETECTION DEVICE AND TIMEPIECE

CROSS-REFERENCE TO RELATED APPLICATION

This application is based upon and claims the benefit of priority from the prior Japanese Patent Application No. 2022-047803, filed Mar. 24, 2022, the entire contents of which is incorporated herein by reference.

BACKGROUND OF THE INVENTION

1. Field of the Invention

The present invention relates to a detection device which detects biological information such as a pulse rate and oxygen saturation, and a timepiece provided with the detection device.

2. Description of the Related Art

For example, a wristwatch is known which has a structure where a watch glass is attached to the upper opening of a wristwatch case, a timepiece module is provided in the wristwatch case, a back cover is provided on the back surface of the wristwatch case, and a detection device which detects a pulse rate is provided on the back cover, as disclosed in Japanese Patent Application Laid-Open (Kokai) Publication No. 2011-147746.

SUMMARY OF THE INVENTION

In order to solve the above-described problem, in accordance with one aspect of the invention, there is provided a detection device comprising: a device main body; and a display arranged on an upper side of the device main body, wherein the device main body is provided with a window for conducting a waterproof test.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment in which the present invention has been applied in a wristwatch will hereinafter be described with reference to FIG. 1 to FIG. 6.

Figure 1:
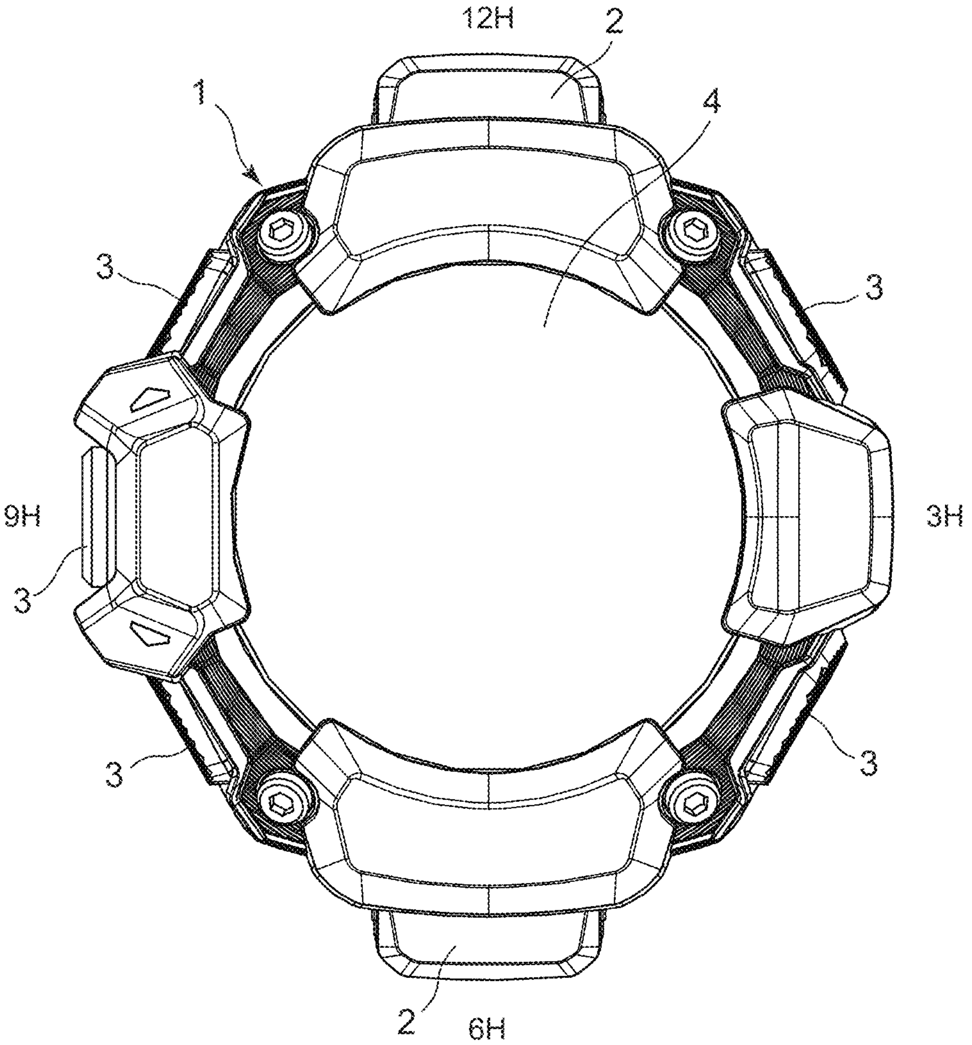
FIG. 1 is an enlarged front view of an embodiment in which the present invention has been applied in a wristwatch.
Figure 2:
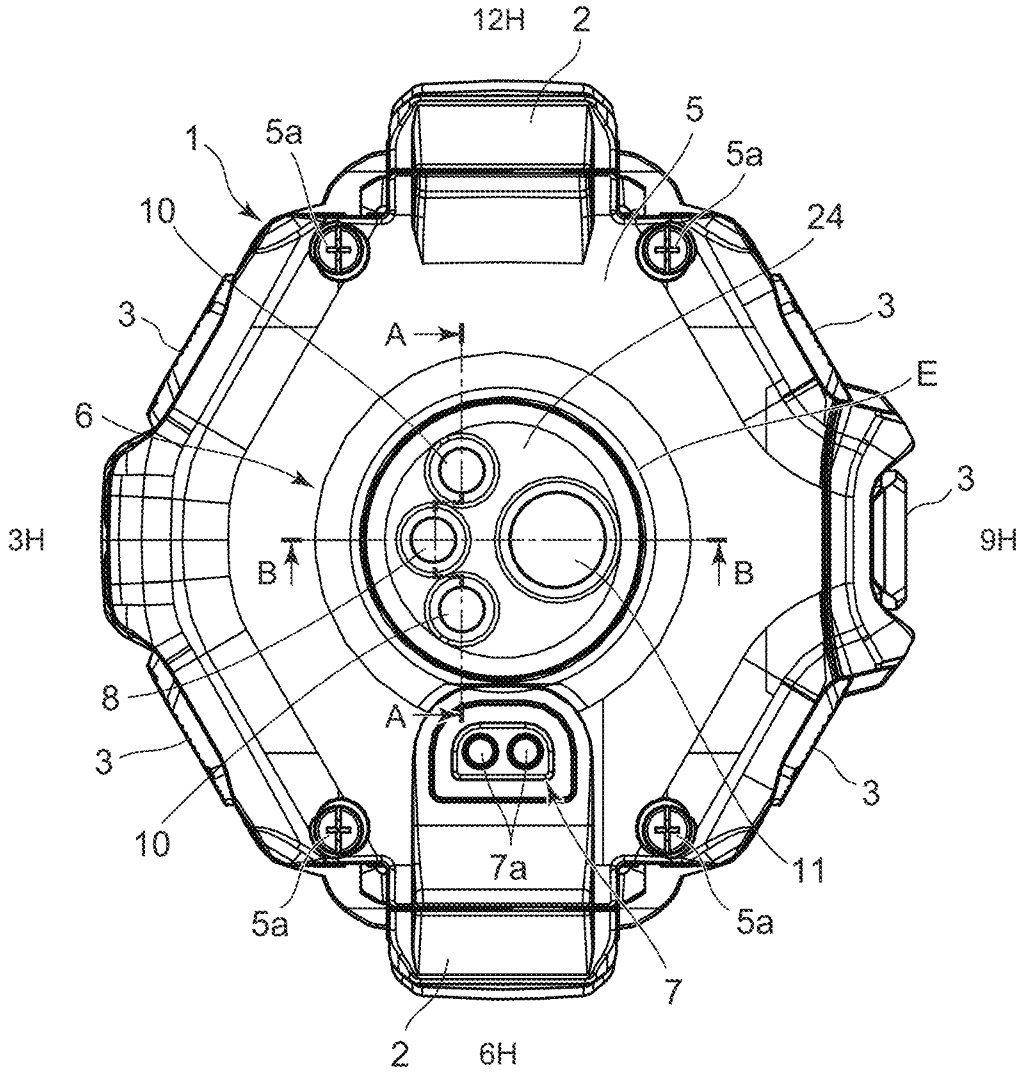
FIG. 2 is an enlarged back view of the wristwatch shown in FIG. 1.

This wristwatch includes a wristwatch case 1, as shown in FIG. 1 and FIG. 2. On the six o'clock side and twelve o'clock side of the wristwatch case 1, band attachment sections 2 are provided to which watch bands (not shown) are attached. In addition, on the two o'clock side, four o'clock side, eight o'clock side, nine o'clock side, and ten o'clock side of the wristwatch case 1, switch sections 3 are provided.

Conventionally, a detection device for wristwatches is known which has a structure where a light receiving window having a round shape is formed at the center of a back cover, a light emitting window having a ring shape is formed around the light receiving window, light from a light emitting element is emitted through the light emitting window having the ring shape and applied to the skin of an arm, and reflected light resulting from the applied light is received by a light receiving element through the light receiving window having the round shape so as to detect a pulse rate on the basis of change in the amount of received light.

In a waterproof test for a wristwatch having this type of detection device, normally, the waterproofness is inspected by the fogging state of the inner surface of a watch glass being examined. Accordingly, this type of wristwatch has a problem in that, in a case where a sheet-shaped display device or the like has been provided on the inner surface of the watch glass, the waterproof test cannot be conducted.

The present embodiment is to improve this situation, and a detection device 6 which enables a favorable waterproof test, and the wristwatch of the present embodiment which is provided with this detection device 6 are described below.

On the upper opening of the wristwatch case 1 of this wristwatch, a watch glass 4 is provided via a glass packing (not shown), as shown in FIG. 1. In addition, to the lower side (back side) of the wristwatch case 1, a back cover 5 which is a device main body is attached by a plurality of screws 5*a* via a waterproof ring (not shown), as shown in FIG. 2. This back cover 5 is formed of a highly rigid synthetic resin acquired by glass fiber or carbon fiber being mixed into polyamide resin or a highly rigid metal such as stainless steel or titanium alloy.

Inside the wristwatch case 1, that is, on the upper side of the back cover 5, a timepiece module (not shown) is provided. Although not shown in the drawings, this timepiece module includes various types of components required for timepiece functions, such as a timepiece movement which moves pointers to indicate the time, a display device which is a flat-type or sheet-shaped display section that electro-optically displays information such as a time of day, a date, and a day of the week, and a circuit section which controls and drives the timepiece movement and the display device.

In the back cover 5 of the wristwatch case 1, the detection device 6 which detects biological information such as a pulse rate and oxygen saturation and a charging terminal section 7 are provided, as shown in FIG. 2 to FIG. 5. The detection device 6, which measures a pulse rate and oxygen saturation, includes a light receiving section 8, first light emitting sections 10 that serve as light emitting portions, and a second light emitting section 11 that also serves as a light emitting portion, which are provided within a circular area E at the center of the back cover 5. The charging terminal section 7, which has a plurality of charging terminals 7*a*, is provided outside the circular area E at the center of the back cover 5 and positioned on the six o'clock side.

Figure 3:
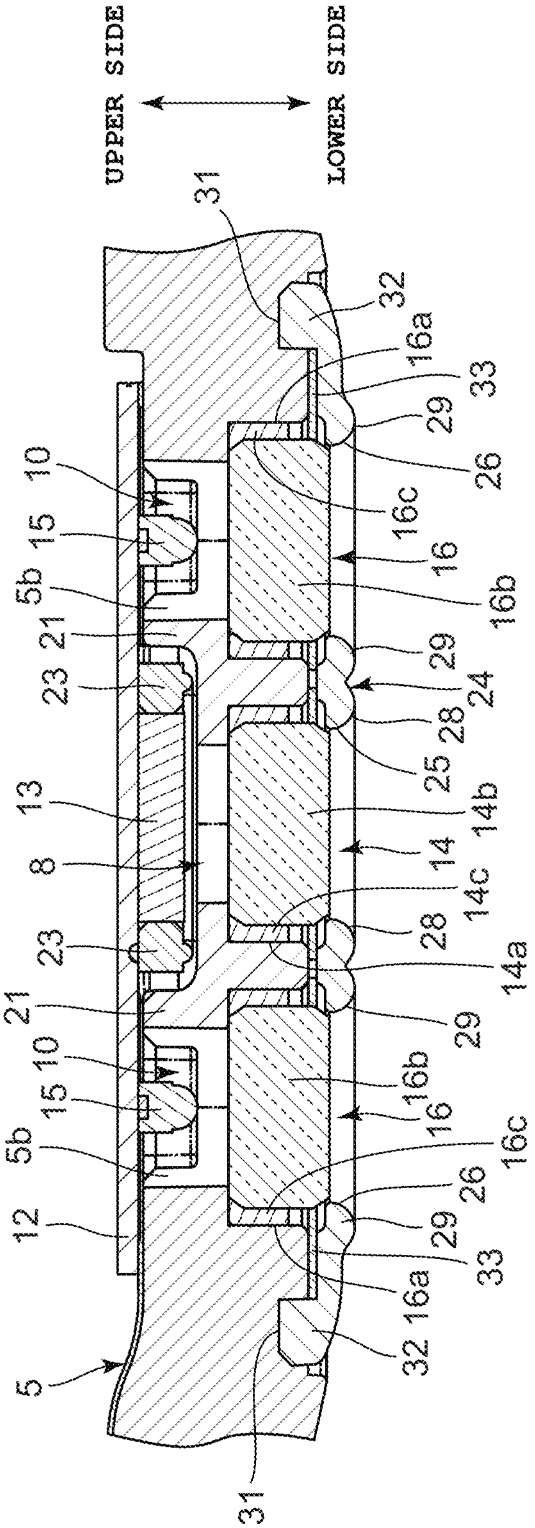
FIG. 3 is an enlarged cross-sectional view showing a main portion of the back cover of the wristwatch inverted and taken along the A-A arrow view in FIG. 2.
Figure 4:
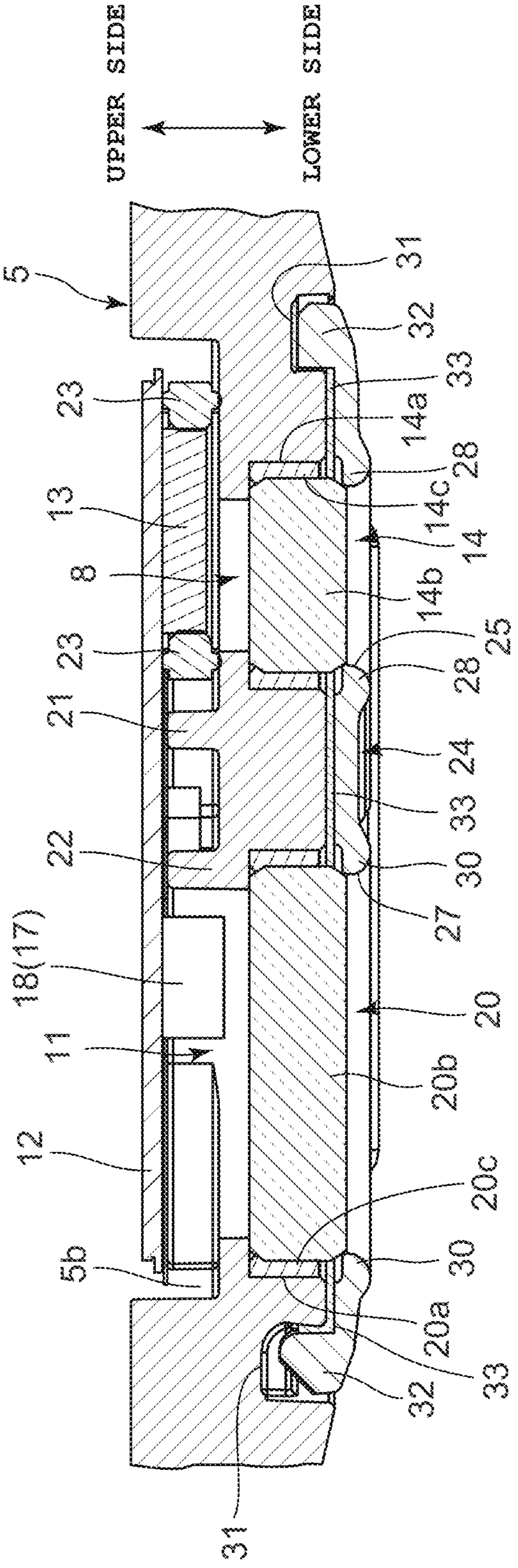
FIG. 4 is an enlarged cross-sectional view showing the main portion of the back cover of the wristwatch inverted and taken along the B-B arrow view in FIG. 2.
Figure 5:
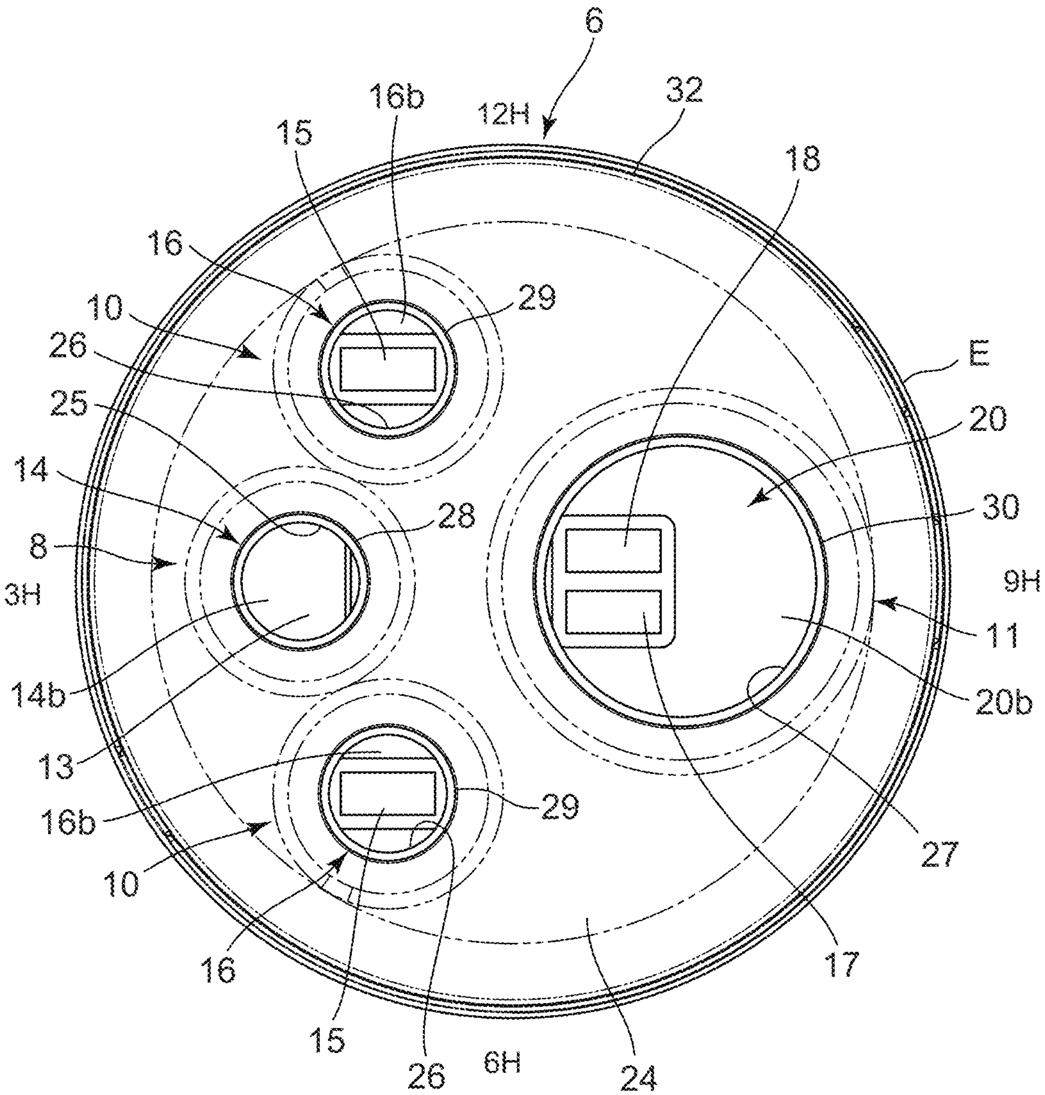
FIG. 5 is an enlarged view showing a main portion of a detection device in the wristwatch shown in FIG. 2.

The detection device 6 is structured to detect a pulse rate by the light receiving section 8 and the first light emitting sections 10 and detect oxygen saturation by the light receiving section 8 and the second light emitting section 11, as shown in FIG. 3 to FIG. 5. The light receiving section 8, which is provided in an area on the three o'clock side of the circular area E at the center of the back cover 5, includes a light receiving element 13 arranged on the three o'clock side of a circuit board 12 provided on the inner surface of the back cover 5 and positioned within the circular area E at the center, and a light receiving window section 14 provided in the area on the three o'clock side of the circular area E at the center of the back cover 5 while corresponding to the light receiving element 13.

The light receiving window section 14 includes a light receiving hole 14*a* formed in the back cover 5 and having a round shape, a light receiving glass cover 14*b* arranged in the light receiving hole 14*a*, and a first waterproof packing 14*c* which is a first waterproof member fitted into a space between the outer circumferential surface of the light receiving glass cover 14*b* and the inner circumferential surface of the light receiving hole 14*a*, as shown in FIG. 3 to FIG. 5. This light receiving window section 14 is formed such that its diameter is shorter than the diameter of the watch glass 4 and the diameter of the circular area E at the center of the back cover 5. For example, its diameter is formed to be about one-fourth the diameter of the circular area E.

As such, the light receiving window section 14 is structured such that its diameter is formed shorter than the diameter of the circular area E at the center of the back cover 5 and the first waterproof packing 14*c* is fitted into the space between the outer circumferential surface of the light receiving glass cover 14*b* and the inner circumferential surface of the light receiving hole 14*a*, whereby waterproofing between the outer circumferential surface of the light receiving glass cover 14*b* and the inner circumferential surface of the light receiving hole 14*a* is ensured to achieve high-pressure waterproofing, as shown in FIG. 3 to FIG. 5.

The first light emitting sections 10 are provided in two areas on the one o'clock side and five o'clock side of the circular area E at the center of the back cover 5, as shown in FIG. 3 and FIG. 5. These first light emitting sections 10 include two light emitting elements 15 arranged in two areas on the one o'clock side and five o'clock side of the circuit board 12 provided on the inner surface of the back cover 5, and two first light emitting window sections 16 which are light emitting window sections provided in the two areas on the one o'clock side and five o'clock side of the circular area E at the center of the back cover 5 while corresponding to the two light emitting elements 15.

The two light emitting elements 15 in the two areas on the one o'clock side and five o'clock side of the circuit board 12, which emit light of a green wavelength (G), are arranged such that their distances to the light receiving element 13 of the light receiving section 8 are equal to each other, as shown in FIG. 3 and FIG. 5. Also, the first light emitting window sections 16 include two first light emitting holes 16*a* having round shapes and formed in the two areas on the one o'clock side and five o'clock side of the circular area E at the center of the back cover 5, and two first light emitting glass covers 16*b* arranged in the two first light emitting holes 16*a*.

These first light emitting window sections 16 further include second waterproof packings 16*c* which are second waterproof members fitted into each space between the outer circumferential surface of each of the two first light emitting glass covers 16*b* and the inner circumferential surface of each of the two first light emitting holes 16*a*, as shown in FIG. 3 and FIG. 5. Also, each first light emitting window section 16 is formed such that its diameter is shorter than the diameter of the circular area E at the center of the back cover 5 and equal to the diameter of the light receiving window section 14.

As such, each first light emitting window section 16 is structured such that its diameter is shorter than the diameter of the circular area E at the center of the back cover 5 and equal to the diameter of the light receiving window section 14 and the second waterproof packings 16*c* are fitted into each space between the outer circumferential surface of each first light emitting glass cover 16*b* and the inner circumferential surface of each first light emitting hole 16*a*, whereby waterproofing between the outer circumferential surface of each first light emitting glass cover 16*b* and the inner circumferential surface of each first light emitting hole 16*a* is ensured to achieve high-pressure waterproofing, as shown in FIG. 3 to FIG. 5.

By having the light receiving section 8 and the two first light emitting sections 10, the detection device 6 is structured such that, when light of a green wavelength (G) emitted from the light emitting elements 15 of the two first light emitting sections 10 are applied to the skin of two portions of an arm through the two first light emitting glass covers 16*b* of the first light emitting window sections 16, and reflected light resulting from the light emitted to the skin of these two portions is received by the light receiving element 13 through the light receiving glass cover 14*b* of the light receiving window section 14, a pulse rate is detected on the basis of change in the amount of received light, as shown in FIG. 3 and FIG. 5.

On the other hand, the second light emitting section 11 is provided in an area on the nine o'clock side of the circular area E at the center of the back cover 5, as shown in FIG. 4 and FIG. 5. This second light emitting section 11 includes first and second light emitting elements 17 and 18 which are light emitting elements arranged on the nine o'clock side of the circuit board 12 provided on the inner surface of the back cover 5, and a second light emitting window section 20 which is a light emitting window section (window in the claims) provided in the area on the nine o'clock side of the circular area E at the center of the back cover 5 while corresponding to the first and second light emitting elements 17 and 18.

Of the first and second light emitting elements 17 and 18, the first light emitting element 17 emits light of a red wavelength (R) which easily absorbed by oxygenated hemoglobin (HbO2), and the second light emitting element 18 emits light of an infrared wavelength (IR) which is easily absorbed by reduced hemoglobin (Hb). These first and second light emitting elements 17 and 18 are arranged on the nine o'clock side of the circuit board 12 such that their distances to the light receiving element 13 of the light receiving section 8 are equal to each other, as shown in FIG. 4 and FIG. 5.

The second light emitting window section 20 includes a second light emitting hole 20*a* which is a round light emitting hole formed in the area on the nine o'clock side of the circular area E at the center of the back cover 5, a second light emitting glass cover 20*b* arranged in the second light emitting hole 20*a*, and a third waterproof packing 20*c* which is a second waterproof member fitted into a space between the outer circumferential surface of the second light emitting glass cover 20*b* and the inner circumferential surface of the second light emitting hole 20*a*, as shown in FIG. 4 and FIG. 5. This second light emitting window section 20 is formed such that its diameter is shorter than the diameter of the circular area E at the center of the back cover 5 and larger than the diameter of the light receiving window section 14.

For example, its diameter is formed to be about half (½) the diameter of the circular area E.

As such, the second light emitting window section 20 is structured such that its diameter is shorter than the diameter of the circular area E at the center of the back cover 5 and larger than the diameter of the light receiving window section 14 and the third waterproof packing 20*c* is fitted into the space between the outer circumferential surface of the second light emitting glass cover 20*b* and the inner circumferential surface of the second light emitting hole 20*a*, whereby waterproofing between the outer circumferential surface of the second light emitting glass cover 20*b* and the inner circumferential surface of the second light emitting hole 20*a* is ensured to achieve high-pressure waterproofing, as shown in FIG. 4 and FIG. 5.

This second light emitting window section 20 is formed such that the area of its surface with respect to the first and second light emitting elements 17 and 18 becomes wider toward the side opposite to the light receiving element 13 of the light receiving section 8, or in other words, the nine o'clock side, as shown in FIG. 4 and FIG. 5. That is, this second light emitting window section 20 is arranged at a position shifted from the first and second light emitting elements 17 and 18 toward the side opposite to the light receiving element 13 of the light receiving section 8.

As a result, this second light emitting window section 20 is structured to be used as an inspection window for inspecting the waterproofness of the wristwatch case 1, as shown in FIG. 4 and FIG. 5. That is, the fogging state of the second light emitting window section 20 is examined to inspect the waterproofness of the wristwatch case 1. Normally, the waterproofness of the wristwatch case 1 is inspected by the fogging state of the watch glass 4 on the upper opening of the wristwatch case 1 being examined. However, in a case where a sheet-shaped display device or the like has been provided on the inner surface of the watch glass 4, the waterproofness cannot be inspected using the watch glass 4. Accordingly, the waterproofness is inspected using the second light emitting window section 20 whose outer diameter is relatively large.

Also, by having the light receiving section 8 and the second light emitting section 11, the detection device 6 is structured such that, when light of a red wavelength (R) and light of an infrared wavelength (IR) emitted from the first and second light emitting elements 17 and 18 of the second light emitting section 11 are applied to the skin of an arm through the second light emitting glass cover 20*b* of the second light emitting window section 20, and reflected light resulting from the emitted light is received by the light receiving element 13 through the light receiving glass cover 14*b* of the light receiving window section 14, oxygen saturation is calculated from the ratio between the amount of received light of a red wavelength (R) and the amount of received light of an infrared wavelength (IR), as shown in FIG. 4 and FIG. 5.

Figure 6:
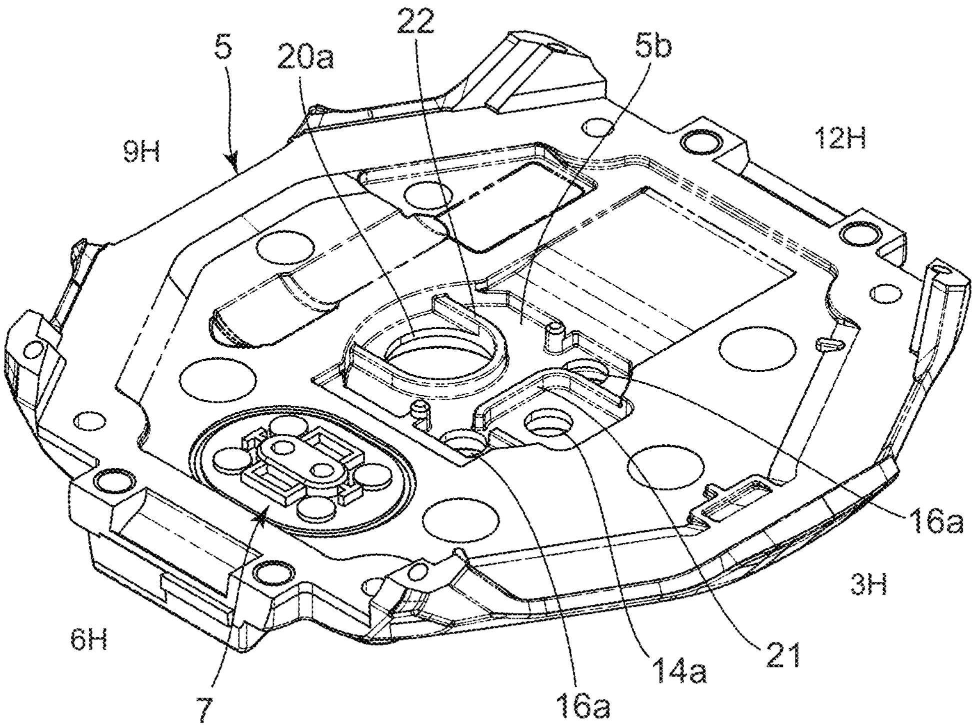
FIG. 6 is an enlarged perspective view showing the inner surface of the back cover shown in FIG. 3 and FIG. 4.

In the circular area E at the center of the inner surface of the back cover 5, a detection recess section 5*b* is formed corresponding to the detection device 6, as shown in FIG. 5 and FIG. 6. In this detection recess section 5*b*, the light receiving section 8, the two first light emitting sections 10, and the second light emitting section 11 are provided. In addition, in this detection recess section 5*b* in the inner surface of the back cover 5, a first light blocking section 21 having a frame shape surrounding the light receiving element 13 of the light receiving section 8, and a second light blocking section 22 having a frame shape surrounding the first and second light emitting elements 17 and 18 of the second light emitting section 11 are formed.

The first light blocking section 21 is formed having a substantially square frame shape which surrounds the light receiving hole 14*a* of the light receiving window section 14 such that a wide space is formed between the first light blocking section 21 and the inner circumference of the light receiving hole 14*a*, as shown in FIG. 6. As a result, the light receiving element 13 of the light receiving section 8 is structured such that only light entered into an area surrounded by the frame-shaped first light blocking section 21 through the light receiving window section 14 is received and other light is blocked by the first light blocking section 21.

The second light blocking section 22 is formed having a substantially semi-circular frame shape which surrounds the second light emitting hole 20*a* of the second light emitting window section 20 such that a small space is formed between the second light blocking section 22 and the inner circumference of the second light emitting hole 20*a*, as shown in FIG. 6. As a result, the first and second light emitting elements 17 and 18 of the second light emitting section 11 are structured such that, by being blocked by the second light blocking section 22, light from the first and second light emitting elements 17 and 18 is emitted outside the back cover 5 only through the second light emitting window section 20 without being directly applied to the light receiving section 8.

Also, the light receiving element 13 of the light receiving section 8 is surrounded by a light blocking member 23 such that its light receiving portion is not covered, as shown in FIG. 3. The light blocking member 23 is formed of synthetic resin and has a substantially square frame shape. This light blocking member 23 is structured to be arranged in the area surrounded by the first light blocking section 21 and to surround the light receiving element 13 such that its light receiving portion, that is, its portion corresponding to the light receiving window section 14 is not covered. As a result, the light receiving element 13 is structured such that only light transmitted through the light receiving window section 14 is received and other light is blocked.

On the other hand, the detection device 6 is provided with a cover member 24 which covers the outer surface of the back cover 5 excluding portions corresponding to the light receiving glass cover 14*b*, the two first light emitting glass covers 16*b*, and the second light emitting glass cover 20*b*, as shown in FIG. 2 to FIG. 5. The cover member 24 is formed of a hygroscopic synthetic resin such as polyamide and has a substantially circular shape as a whole. This cover member 24 includes a first cover hole 25 corresponding to the light receiving glass cover 14*b*, two second cover holes 26 corresponding to the two first light emitting glass covers 16*b*, and a third cover hole 27 corresponding to the second light emitting glass cover 20*b*.

On an inner circumferential portion of the first cover hole 25, a first hold-down section 28 is formed that covers and holds down the outer circumferential rim of the light receiving glass cover 14*b* which is a non-effective area, as shown in FIG. 3 and FIG. 4. This first hold-down section 28 is structured to hold down the chamfered portion of the outer circumferential rim of the light receiving glass cover 14*b*, and thereby prevent the light receiving glass cover 14*b* from slipping out from the light receiving hole 14*a* toward the outside of the back cover 5.

Also, on inner circumferential portions of the two second cover holes 26, two second hold-down sections 29 are formed that cover and hold down the outer circumferential rims of the first light emitting glass covers 16*b* which are non-effective areas, as shown in FIG. 3. These two hold-down sections 29 are structured to hold down the chamfered portions of the outer circumferential rims of the first light emitting glass covers 16*b*, and thereby prevent the first light emitting glass covers 16*b* from slipping out from the first light emitting holes 16*a* toward the outside of the back cover 5.

Moreover, on an inner circumferential portion of the third cover hole 27, a third hold-down section 30 is formed that covers and holds down the outer circumferential rim of the second light emitting glass cover 20*b* which is a non-effective area, as shown in FIG. 4. This third hold-down section 30 is structured to hold down the chamfered portion of the outer circumferential rim of the second light emitting glass cover 20*b*, and thereby prevent the second light emitting glass cover 20*b* from slipping out from the second light emitting hole 20*a* toward the outside of the back cover 5.

Furthermore, on an outer circumferential portion of the cover member 24, an attachment projection section 32 is formed that is fitted into an attachment recess section 31 annularly formed in an outer circumferential portion of the outer surface of the circular area E at the center of the back cover 5, as shown in FIG. 3 and FIG. 4. In addition, on the inner surface of the cover member 24, a double-sided adhesive tape 33 is provided. As a result, the cover member 24 is structured to adhere to a central portion of the outer surface of the back cover 5 with the double-sided adhesive tape 33 when arranged on the outer surface of the circular area E at the center of the back cover 5 such that the attachment projection section 32 of the outer circumferential portion is fitted into the attachment recess section 31 annularly formed in the outer surface of the back cover 5.

Next, the use of this wristwatch is described.

Normally, this wristwatch is used by the wristwatch case 1 being on worn an arm. Here, a time of day, a day of the week, and a date displayed by the timepiece module (not shown) in the wristwatch case 1 can be visually checked through the watch glass 4. When a pulse rate and oxygen saturation are to be detected in this state, first, the plurality of switch sections 3 is selectively operated so as to set the wristwatch to a detection mode.

Then, when the detection device 6 starts detection in this state, the light emitting elements 15 of the two first light emitting sections 10 of the detection device 6 emit light of a green wave length (G), and this emitted light of the green wave length (G) is applied to two portions of the skin of the arm through the first light emitting glass covers 16*b* of the two first light emitting window sections 16. Subsequently, reflected light resulting from the light emitted to the two portions of the skin is received by the light receiving element 13 of the light receiving section 8 through the light receiving glass cover 14*b* of the light receiving window section 14. In this state, the detection device 6 calculates a pulse rate on the basis of change in the amount of received light.

In the above-described detection, when the light emitting elements 15 of the two first light emitting sections 10 emit light of a green wave length (G), this light is blocked by the first light blocking section 21 and the light blocking member 23 for the light receiving section 8. Accordingly, the light of the green wave length (G) emitted by the light emitting elements 15 is not directly applied to the light receiving element 13 of the light receiving section 8. As a result, only light reflected from the skin of the arm and transmitted through the light receiving window section 14 of the light receiving section 8 is received. By this structure, the pulse detection performance of the detection device 6 is enhanced.

Also, here, the first light emitting element 17 of the second light emitting section 11 of the detection device 6 emits light of a red wavelength (R), the second light emitting element 18 thereof emits light of an infrared wavelength (IR), and each light of the red wavelength (R) and the infrared wavelength (IR) is applied to the skin of the arm through the second light emitting glass cover 20*b* of the second light emitting window section 20. Subsequently, reflected light resulting from each emitted light is received by the light receiving element 13 of the light receiving section 8 through the light receiving glass cover 14*b* of the light receiving window section 14. In this state, the detection device 6 calculates oxygen saturation on the basis of the ratio between the received amount of reflected light of the red wavelength (R) and the received amount of reflected light of the infrared wavelength (IR) in the light receiving element 13.

In this case as well, when the first and second light emitting elements 17 and 18 of the second light emitting section 11 emit light of a red wavelength (R) and light of an infrared wavelength (IR), each light is blocked by the second light blocking section 22 for the second light emitting section 11 and the first light blocking section 21 and the light blocking member 23 for the light receiving section 8. Accordingly, the light of the red wavelength (R) and the light of the infrared wavelength (IR) emitted by the first and second light emitting elements 17 and 18 are not directly applied to the light receiving element 13 of the light receiving section 8. As a result, only light reflected from the skin of the arm and transmitted through the light receiving window section 14 of the light receiving section 8 is received. By this structure, the oxygen saturation detection performance of the detection device 6 is enhanced.

Next, a waterproof test for this wristwatch is described.

Normally, this waterproof test is performed using a method in which the wristwatch case 1 is sunk under water and then the fogging state of the inner surface of the watch glass 4 is examined. Then, if the watch glass 4 is fogged, it is found that water has penetrated into the wristwatch. However, in a case where the watch glass 4 cannot be used to inspect the fogging state, such as when a sheet-shaped display device or the like has been directly provided on the inner surface of the watch glass 4, the waterproof test is conducted using the second light emitting glass cover 20*b* of the detection device 6.

Here, the diameter of the second light emitting glass cover 20*b* of the second light emitting window section 20 is larger than that of the light receiving glass cover 14*b* of the light receiving window section 14 and those of the first light emitting glass covers 16*b* of the first light emitting window sections 16. Accordingly, the waterproof test can be conducted by use of the second light emitting glass 20*b*. This second light emitting window section 20 is formed such that the area of its surface with respect to the first and second light emitting elements 17 and 18 becomes wider toward the side opposite to the light receiving element 13 of the light receiving section 8, or in other words, the nine o'clock side.

That is, this second light emitting window section 20 is arranged with the second light emitting glass cover 20*b* being shifted from a position corresponding to the first and second light emitting elements 17 and 18 toward the side opposite to the light receiving element 13 of the light receiving section 8. As such, by having the large outer diameter, the second light emitting window section 20 can be used as an inspection window for inspecting the waterproofness of the wristwatch case 1, that is, an inspection window for inspecting the fogging state.

As described above, the detection device 6 of this wristwatch includes the back cover 5 which is a device main body, and the display device of the timepiece module (neither of them is shown) which is a display section arranged on the upper side of the back cover 5. In the back cover 5, the second light emitting window section 20 is provided which is a window to be used for waterproof tests. As a result of this structure, the watch glass 4 is not constrained by waterproof tests, and waterproof tests can be favorably conducted by the second light emitting window section 20.

Also, the detection device 6 of this wristwatch includes the light receiving window section 14 which is provided in the back cover 5 and corresponds to the light receiving element 13 in addition to the second light emitting window section 20 which is provided in the back cover 5 and corresponds to the first and second light emitting elements 17 and 18 (light emitting element in the claims), and the second light emitting window section 20 is formed such that the area of its surface is larger than that of the light receiving window section 14. As a result of this structure, waterproof tests are not required to be conducted using the watch glass 4 whose surface area is larger than that of the second light emitting window section 20, whereby the watch glass 4 is not constrained by waterproof tests, and waterproof tests can be favorably conducted by the second light emitting window section 20.

That is, in the case of the detection device 6 of this wristwatch, since the area of the surface of the second light emitting window section 20 is larger than that of the light receiving window section 14, waterproof tests can be efficiently and favorably conducted by this larger second light emitting window section 20. As a result of this structure, waterproof tests are not required to be conducted using the watch glass 4, whereby the watch glass 4 is not constrained by waterproof tests, and waterproof tests can be favorably conducted by the second light emitting window section 20.

Moreover, in the case of the detection device 6 of this wristwatch, the second light emitting window section 20 is formed large such that the area of its surface with respect to the first and second light emitting elements 17 and 18 becomes wider toward the side opposite to the light receiving element 13. That is, here, the second light emitting window section 20 can be formed large with the distance between the first and second light emitting elements 17 and 18 and the light receiving element 13 being maintained constant, whereby waterproof tests can be efficiently conducted by the second light emitting window section 20.

Furthermore, in the case of the detection device 6 of this wristwatch, the back cover 5 serving as a main device body is provided with the first light blocking section 21 having a frame shape surrounding the light receiving element 13, and the second light blocking section 22 having a frame shape surrounding the first and second light emitting elements 17 and 18 of the second light emitting section 11. By these first and second light blocking sections 21 and 22, the detection performance for detecting biological information such as oxygen saturation is enhanced.

More specifically, light emitted by the first and second light emitting elements 17 and 18 of the second light emitting section 11 is reliably blocked so as not to be directly received by the light receiving element 13 of the light receiving section 8, and only light that has entered through the light receiving window section 14 is received by the light receiving element 13 of the light receiving section 8. As a result of this structure, the detection performance for detecting biological information such as oxygen saturation is enhanced.

In addition, light from the first and second light emitting elements 17 and 18 of the second light emitting section 11 is reliably blocked so as not to be directly received by the light receiving element 13 of the light receiving section 8, and emitted to the outside of the back cover 5 only through the second light emitting window section 20. By this structure as well, the detection performance for detecting biological information such as oxygen saturation is enhanced.

Also, in the detection device 6 of this wristwatch, since the light receiving element 13 is surrounded by the light blocking member 23 except for its light receiving portion, only light that has passed through the light receiving window section 14 corresponding to the light receiving portion is received and other light, which is not needed, is reliably blocked by the light blocking member 23. By this structure as well, the detection performance is enhanced.

Moreover, in the case of the detection device 6 of this wristwatch, the first light emitting element 17 of the second light emitting section 11 emits light of a red wavelength (R) and the second light emitting element 18 thereof emits light of an infrared wavelength (IR). As a result of this structure, oxygen saturation can be accurately and reliably detected. That is, in this detection device 6, since light of a red wavelength (R) emitted by the first light emitting element 17 is easily absorbed by oxygenated hemoglobin and light of an infrared wavelength (IR) emitted by the second light emitting element 18 is easily absorbed by reduced hemoglobin, oxygen saturation can be accurately and favorably detected on the basis of the ratio between the received amount of reflected light of the red wavelength (R) and the received amount of reflected light of the infrared wavelength (IR).

Furthermore, in the detection device 6 of this wristwatch, the first and second light emitting elements 17 and 18 are adjoiningly arranged such that their distances to the light receiving element 13 are equal to each other. Accordingly, even though the second light emitting window section 20 is formed large such that the area of its surface with respect to the first and second light emitting elements 17 and 18 becomes wider toward the side opposite to the light receiving element 13, the distance between the first and second light emitting elements 17 and 18 and the light receiving element 13 is maintained constant. As a result of this structure, by the first and second light emitting elements 17 and 18 and the light receiving element 13, oxygen saturation is favorably detected.

Still further, in the case of the detection device 6 of this wristwatch, light of a green wavelength (G) emitted by the light emitting elements 15 of the first light emitting sections 10 is applied to the skin of an arm, and reflected light resulting from the light of the green wavelength (G) applied to the skin of the arm is received. As a result of this structure, on the basis of change in the amount of received light, a pulse rate can be accurately and favorably detected.

Yet still further, in the detection device 6 of this wristwatch, the second light emitting window section 20 and the light receiving window section 14 are arranged side by side in in the three o'clock and nine o'clock directions, and thereby arranged along an arm in the length direction of the arm. As a result of this structure, the second light emitting window section 20 and the light receiving window section 14 are unfailingly pressed against the skin of an arm, and thereby not affected by light from outside the wristwatch case 1. Accordingly, oxygen saturation can be accurately and favorably detected.

Yet still further, in this wristwatch, the detection device 6 is provided in the back cover 5 attached to the back of the wristwatch case 1. Accordingly, when the wristwatch case 1 is worn on an arm, the detection device 6 provided in the back cover 5 is also arranged on the arm and, by this detection device 6, biological information such as a pulse rate and oxygen saturation is detected. As a result of this structure, this wristwatch is easy to use and user-friendly.

In the above-described embodiment, the detection device 6 is provided with the first light emitting sections 10 and the second light emitting section 11. However, the present invention is not limited thereto, and the detection device 6 is not necessarily required to have both of the first and second light emitting sections 10 and 11. For example, a structure may be adopted in which the detection device 6 has only one of the first and second light emitting sections 10 and 11.

Also, in the above-described embodiment, the second light emitting window section 20 of the second light emitting section 11 is formed larger than the light receiving window section 14 and used as a window for waterproof tests. However, the present invention is not limited thereto, and a structure may be adopted in which the light receiving window section 14 of the light receiving section 8 and the first light emitting window sections 16 of the first light emitting sections 10 are formed to have the same size as the second light emitting window section 20, and used as windows for waterproof tests. In this structure, each first light emitting window section 16 is formed such that the area of its surface with respect to the corresponding light emitting element 15 becomes wider toward the side opposite to the light receiving element 13 of the light receiving section 8.

Moreover, in the above-described embodiment, the light receiving section 8 and the second light emitting section 11 are arranged side by side in the three o'clock and nine o'clock directions. However, the present invention is not limited thereto, and they may be arranged side by side in the twelve o'clock and six o'clock directions. As long as they are diagonally arranged, any direction can be adopted.

Furthermore, in the above-described embodiment, the present invention has been applied in a wristwatch. However, the present invention is not necessarily required to be applied in a wristwatch. For example, the present invention is applicable to various types of timepieces such as a travel watch, an alarm clock, a table clock, and a wall clock. In addition, the present invention is not necessarily required to be applied in timepieces, and can be applied in electronic devices such as a portable terminal.

While the present invention has been described with reference to the preferred embodiments, it is intended that the invention be not limited by any of the details of the description therein but includes all the embodiments which fall within the scope of the appended claims.

What is claimed is:

1. A detection device comprising:

a device main body;

a display arranged on an upper side of the device main body;

a light receiving window provided in the device main body and corresponding to a light receiving element; and a light emitting window for conducting a waterproof test, the light emitting window being provided in the device main body and corresponding to a light emitting element, wherein a surface area of the light emitting window is larger than a surface area of the light receiving window.

2. The detection device according to claim 1, wherein the light emitting window is larger than the light emitting element and the light emitting element is arranged beneath a portion of the light emitting window closer to the light receiving element.

3. The detection device according to claim 1, wherein the device main body comprises a first light block having a frame shape surrounding the light receiving element, and a second light block having a frame shape surrounding the light emitting element.

4. The detection device according to claim 2, wherein the device main body comprises a first light block having a frame shape surrounding the light receiving element, and a second light block having a frame shape surrounding the light emitting element.

5. The detection device according to claim 1, further comprising a light blocking member surrounding the light receiving element except for a light receiving area.

6. The detection device according to claim 2, further comprising a light blocking member surrounding the light receiving element except for a light receiving area.

7. The detection device according to claim 3, further comprising a light blocking member surrounding the light receiving element except for a light receiving area.

8. The detection device according to claim 4, further comprising a light blocking member surrounding the light receiving element except for a light receiving area.

9. The detection device according to claim 1, further comprising the light emitting element, wherein the light emitting element comprises a first light emitting element configured to emit light of a red wavelength and a second light emitting element configured to emit light of an infrared wavelength.

10. The detection device according to claim 2, further comprising the light emitting element, wherein the light emitting element comprises a first light emitting element configured to emit light of a red wavelength and a second light emitting element configured to emit light of an infrared wavelength.

11. The detection device according to claim 3, further comprising the light emitting element, wherein the light emitting element comprises a first light emitting element configured to emit light of a red wavelength and a second light emitting element configured to emit light of an infrared wavelength.

12. The detection device according to claim 4, further comprising the light emitting element, wherein the light emitting element comprises a first light emitting element configured to emit light of a red wavelength and a second light emitting element configured to emit light of an infrared wavelength.

13. The detection device according to claim 9, wherein the first light emitting element and the second light emitting element are adjoiningly arranged such that distances thereof to the light receiving element are equal to each other.

14. The detection device according to claim 10, wherein the first light emitting element and the second light emitting element are adjoiningly arranged such that distances thereof to the light receiving element are equal to each other.

15. The detection device according to claim 1, further comprising the light emitting element, wherein the light emitting element is configured to emit light of a green wavelength.

16. The detection device according to claim 2, further comprising the light emitting element, wherein the light emitting element is configured to emit light of a green wavelength.

17. A timepiece comprising the detection device according to claim 1.

18. The timepiece according to claim 17, further comprising:

a timepiece case, wherein the display is arranged in the timepiece case, wherein the device main body is a back cover attached to a back surface of the timepiece case.

19. The timepiece according to claim 17, wherein the light emitting window and the light receiving window are arranged side by side in three o'clock and nine o'clock directions of the timepiece.

* * * * *